Oct. 1, 1946.  E. B. NOEL ET AL  2,408,470
MULTIFLASH LAMP DEVICE
Filed Nov. 1, 1943  2 Sheets-Sheet 1
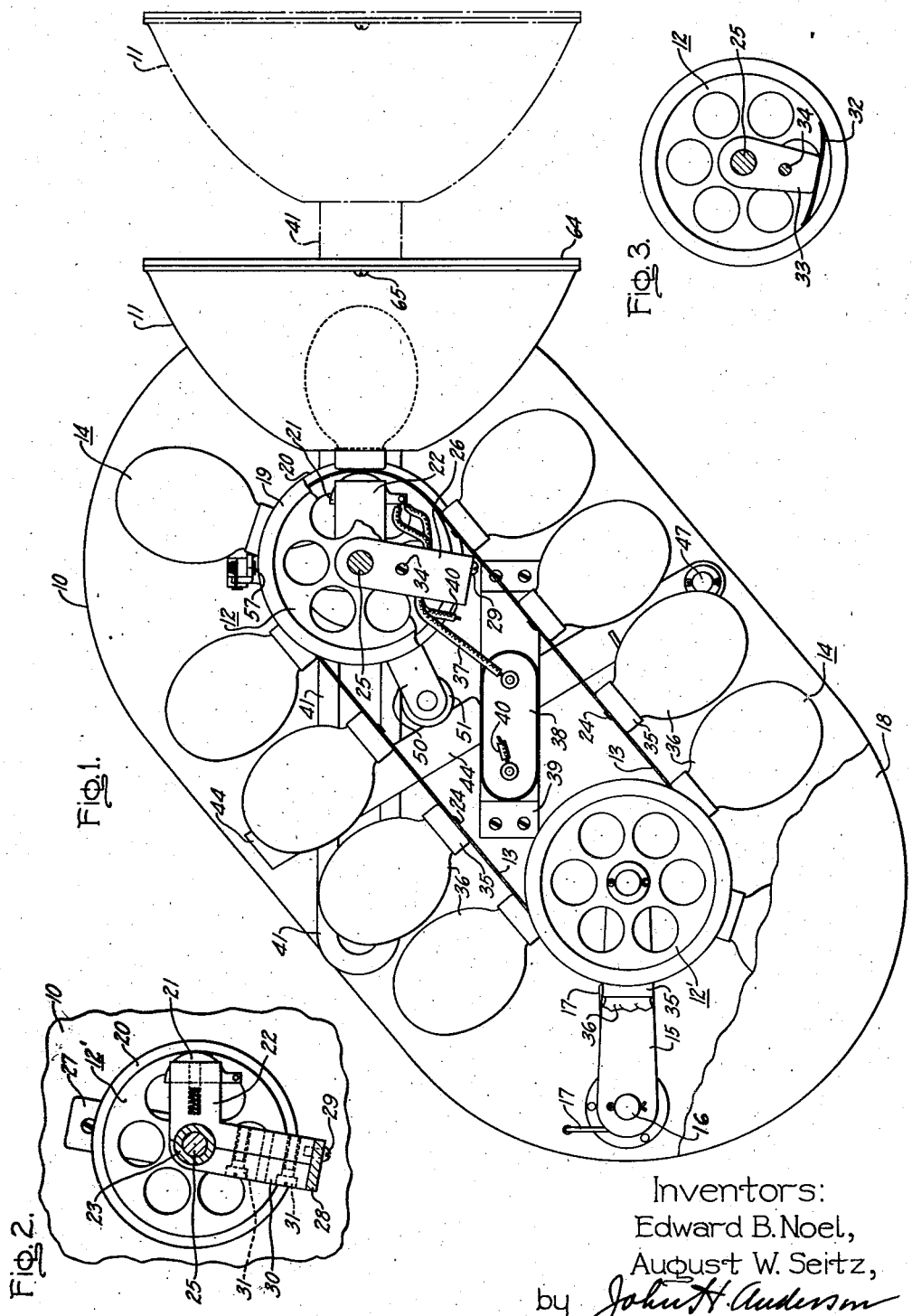
Inventors:
Edward B. Noel,
August W. Seitz,
by John H. Anderson
Their Attorney.

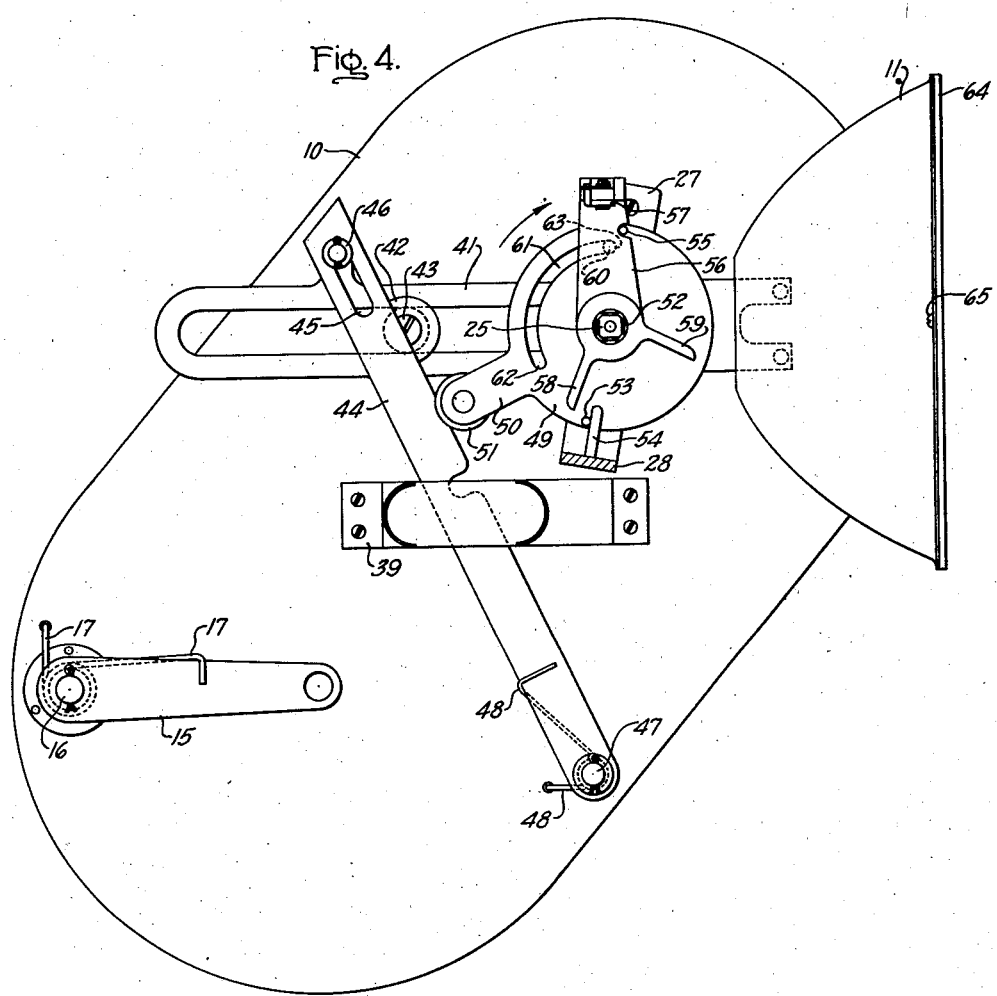

Patented Oct. 1, 1946

2,408,470

UNITED STATES PATENT OFFICE 2,408,470

MULTIFLASH LAMP DEVICE

Edward B. Noel, Cleveland Heights, and August W. Seitz, Euclid, Ohio, assignors to General Electric Company, a corporation of New York Application November 1, 1943, Serial No. 508,494

6 Claims. (Cl. 240—37)

Our invention relates to illuminating apparatus for photographic purposes and its principal object is to provide an apparatus of this kind capable of emitting a number of flashes of light in rapid succession to enable a photographer to take a series of pictures in a short time. Further objects and advantages of the invention will appear from the following detailed description of species thereof and from the appended claims.

In the drawings accompanying and forming part of this specification, species of my invention are shown in which Fig. 1 is a side elevational, partly sectional view of the apparatus with a portion of the casing broken away to show the arrangement of the internal parts; Fig. 2 is a fragmentary, side-elevational, partly sectional view showing the details of the contacts engageable with the lamps shown in Fig. 1; Fig. 3 is a similar view of a braking mechanism for one of the wheels shown in Fig. 1; and Fig. 4 is a side-elevational view of the apparatus shown in Fig. 1 showing the mechanism for actuating the various parts.

Referring to Fig. 1 of the drawings, the multiflash lamp device comprises a casing 10 having a reflector 11, which is preferably parabolic, partially recessed therein, and a pair of flanged wheels 12 and 12' rotatably mounted on casing 10 and supporting an endless band 13 to which is secured in equally spaced positions a plurality of flash lamps 14. The lamps 14 comprise a light transmitting bulb containing a combustible material, and a supporter of combustion, such as oxygen. The combustible material, when ignited, produces a flash of actinic light useful for photographic purposes. The ignition means comprises a tungsten filament connected across a pair of current leading-in wires. Such lamps are disclosed in the Fulton and Foote application Serial No. 461,578, filed October 10, 1942, and assigned to the assignee of this application.

The wheel 12' is mounted for rotation on an axle secured to an arm 15 which arm is pivotally mounted at 16 on the casing 10 so as to be movable in a circular arc about the pivot 16. A spring 17 is secured to the casing 10 and the arm 15 and tends to move wheel 12' away from wheel 12 so as to keep the band 13 under tension when the latter is engaged with the wheels 12 and 12'. The band 13 carrying the lamps 14 is inserted in the apparatus by removing the panel or cover 18 (shown partially broken away in the drawings) of the casing 10, forcing the wheel 12' toward the wheel 12 against the tension exerted by the spring 17 a sufficient distance to permit placing the band 13 over both of said flanged wheels 12 and 12'. The wheel 12' may then be released to travel away from wheel 12 until its motion is arrested by the band 13. After the lamps 14 have been flashed in sequence, in the manner described in detail hereinafter, the band 13 is removed from the wheels 12 and 12' in the same manner and a new band is inserted.

The wheel 12, which is shown partially broken away in the drawings, has two spaced flanges 19 and 20 which are spaced apart a sufficient distance to accommodate a pair of spaced contacts 21 set into a body 22 of electrically insulating material which, as shown in Fig. 2, engages with and has a portion or leg extending from the center portion of the hub 23 of the wheel 12 and outward toward the periphery of the flanges 19 and 20 a distance such that the contacts 21, which have semi-circular edges, engage a pair of spaced contacts 24 (see Fig. 1) which are centrally disposed and spaced apart on the band 13 and project a slight distance beyond the surface of band 13 engaging the flanges 19 and 20 of wheel 12. As best shown in Fig. 2, the wheel 12 is mounted on an axle 25 on which it is free to rotate. The axle 25 is supported at each of its ends by a bracket 26 which is bolted to the casing 10 at two places along the part 27 thereof contiguous with said casing 10. The lower part 28 of bracket 26 has secured thereto by bolts 29 the contact-free portion of support 22 so that the latter does not rotate about the hub 23 to which it is engaged by the separable part 30 thereof held in place by bolts 31. The part of bracket 26 parallel to part 27 supports the end portion of axle 25 more remote from casing 10.

The lamp contacts 24, shown in Fig. 1 are connected to the current leading-in wires of the lamps 14 and consist of wires passing through and secured to the base 35 of the lamps 14 which base is permanently secured to the light transmitting lamp bulbs 36. The wires pierce the band 13, which consists of flexible, electrically insulating material, such as heavy paper or an organic plastic, and are bent over so as to clamp the band 13 to the lamp bases 35. Thus, the lamps 14 are secured to the band 13 and the wires constitute spaced contacts 24 for engagement with the spaced contacts 21 projecting from the insulating body 22.

One of the contacts 21 is connected by wire 37 to one terminal of a source of electrical energy constituted by a battery of cells in the battery case 38 supported between the wheels 12 and 12' by the support 39 bolted to the casing 10. The other contact 21 is connected to the other terminal of the source by the wire 40 shown in two parts in the drawings. It will be understood that the part of the wire 40 not shown in the drawings passes out of the casing 10 for connection to the terminals of a switch the operation of which is controlled by an apparatus for synchronizing the opening of the shutter of the camera with the flashing of the lamp 14 in the reflector 11. Such synchronizing apparatus is well known, constitutes no part of this invention and, hence, has not been illustrated in the drawings.

The reflector 11 has a circular opening at its vertex which opening is large enough for the bulbs 36 of the lamps 14 to pass therethrough into and out of the reflector when the latter is moved from the position shown in full lines in the drawings to that shown in dot-dash lines, and back again. When the reflector is in the position shown in full lines, the focal point thereof is within the bulb of the lamp 14 so that the light emitted when the lamp is ignited in the manner described above is directed by the reflector 11 toward the object to be photographed.

The reflector 11 is moved from the position shown in full lines to that shown in dot-dash lines in Fig. 1 to insert the band 13 between wheels 12 and 12' and to permit the movement of the band 13 with its attached lamps 14 after one lamp has been flashed and the next lamp in the series is to be moved into position to be flashed. Thus, the reflector is moved, by the mechanism described hereinafter, out of the path of movement of the lamps 14 before the latter are moved, by the mechanism also described hereinafter, to bring the next lamp 14 of the series to be flashed into the position where its contacts 24 engage with the contacts 21 and the reflector 11 may be returned to the position shown in full lines in Fig. 1 without hitting the lamps 14 on its return movement.

A brake for holding the lamps 14 stationary while the reflector 11 is being moved and between periods of movement of the lamps 14 is shown in Fig. 3 of the drawings. The brake comprises a resilient brake-shoe 32 which is held against the inner surface of the flange 19 of the wheel 12 by holder 33. The holder 33 is disposed between flange 19 and bracket 26, engages with the axle 25 and is secured against rotation to the bracket 26 by the pin 34.

The mechanism for moving the reflector 11 with respect to the lamp support comprised of the wheels 12 and 12' and out of the path of movement of the lamps 14 about the wheels 12 and 12' is illustrated in Fig. 4 of the drawings. The mechanism for moving the lamps through the position normally occupied by the reflector 11 is also shown in this figure. Referring to Fig. 4, the reflector 11 is movably supported by the slotted member 41 to which it is rigidly secured by welding, for example. The slotted member 41 is supported by the wheel 42 mounted on axle 43 fastened to the casing 10 and a bushing (not shown) secured to the portion of axle 25 adjacent the bracket leg 27. The member 21 and therewith reflector 11 is thus movable on its supports in the direction of the longitudinal axis of the reflector. An arm 44 engages member 41 through the slot 45 therein engaging wheel 46 secured to member 41. The arm 44 is pivoted on the casing 10 at 47 and is urged to swing in the direction of the reflector 11 by spring 48, one end of which is fastened to casing 10 and the other end of which presses against arm 44. The arm 44 is disposed between the casing 10 and the battery support 39 and moves freely between these members.

The movement of the arm 44 and therewith the reflector 11 is controlled by the disc 49 having the projection 50 which supports wheel 51. As the disc is rotated in the manner described below, the wheel 51 travels along the arm 44 to permit or force the latter to move. The disc 49 is journaled to the axle 25 which is slightly flattened, as shown at 52, where it engages disc 49. Thus, by rotating axle 25, the projection 50 may be rotated and thus the reflector 11 moved into the two positions shown in Fig. 1. The axle 25 is prolonged so as to terminate outside of the casing 10 and provided with a crank at its externally protruding portion for rotating it. The disc 49 thus may be rotated from the position shown, in which it is held by the force exerted by spring 48 holding the pin 53 on the disc 49 against the stop 54 secured to bracket part 28 between wheel flange 20 and bracket part 27, to a position in which pin 55 on disc 49 rests against the stop 54 and back again by turning the crank on axle 25 in the proper direction.

After the reflector has been moved out of the path of movement of the lamps, by the mechanism described above, the lamps are moved on the wheels 12 and 12' to bring an unflashed lamp into position to be flashed. This is accomplished as follows: the mechanism for moving the lamps is synchronized with the above-described mechanism for moving the reflector 11 and comprises an arm 56 rotatable on the axle 25, carrying a lamp engaging pawl 57 at its outer end portion and two fingers 58 and 59 engageable with the stop 54 to limit the rotational movement of the arm 56. Arm 56 is disposed between flange 20 and disc 49. The pawl 57 is pivoted on the arm 56 in a direction parallel to the length of arm 56 and is provided with a conventional spring and stop tending to hold the pawl 57 normal to the arm 56. Thus, in the position shown in Figs. 1 and 4 the pawl 57 engages with the base of a lamp 14 to urge the latter, when arm 56 is moved in the direction of the arrow, into position to be flashed. On the return movement of arm 56 the pawl 57 will first strike the next lamp base, will then turn on its pivot to pass by said lamp base and will then snap back to its original lamp engaging position normal to arm 56 when the lamp has been passed.

The rotational movements of arm 56 is controlled by the pin 60 thereon projecting in the direction of the disc 49 and engaging with the arcuate slot 61 in the disc 49. As is readily apparent from Fig. 4, the disc 49 may be rotated an appreciable angular distance in the direction of the arrow before the pin 60 engages with end 62 of slot 61 to move the arm 56 and therewith the lamp engaging pawl 57. These parts are so related that as the disc 49 is turned by the crank in the direction of the arrow, the reflector 11 is first moved from the position in which it encloses a lamp 14 to the position (shown in dot-dash lines in Fig. 1) where it is out of the path of travel of the lamps 14. With the reflector 11 in this position, the pin 60 on the pawl supporting arm 56 engages the end 62 of slot 61 and as the turning movement of disc 49 continues, the pawl 57 is moved to bring the next lamp 14 in the series in line with the axis of the reflector 11 and into engagement with the contacts 21. In this position the pin 55 on the disc 49 and the finger 59 of arm 56 rests against the stop 54. Incidentally, these elements are preferably in this position when the band 13 carrying the lamps 14 is inserted in the device. In this operation if one lamp 14 is placed in the position where its contacts 24 engage contacts 21 and its longitudinal axis is in the reflector axis, the band 13 and the equally spaced lamps 14 thereon will be properly indexed in the device.

After the lamp to be flashed has been moved into the proper position for flashing, the disc 49 is turned by the crank in the opposite direction to that indicated by the arrow. The reflector 11 is thus moved back to its lamp enclosing position and the pawl 57 to its position engaging the next lamp in the series to be flashed. The device is then ready to emit a flash of light when the switch on the synchronizing apparatus is closed.

A light transmitting member 64, illustrated in Figs. 1 and 4, may be secured by bolts 65, for example, to the front of reflector 11 so as to influence the emitted light. The member may be a filter for screening-out or absorbing part of the radiant energy emitted by a flashed lamp.

Mounting the lamps 14 on a flexible band or endless strip 13 is advantageous not only for use in the above apparatus in which a plurality of lamps can be inserted and removed simultaneously to eliminate delay in taking a series of photographs, but is also useful in the manufacturing and packaging of the lamps. Thus, a group of bases 35 for the lamps 14 may be secured by the current leading-in wires 24 in series relation to the strip 13 before the bulbs 36 are mounted on the bases 35. The bulbs 36 are then mounted on the bases 35 and the other steps in the manufacture of the lamps performed. After the lamps 14 have been completed, the multiflash unit comprising a plurality of lamps secured to the strip 13 may be packaged for shipment without handling individual lamps.

The lamps disclosed in the application Serial No. 461,578 referred to above comprise a compact body supported in the lamp bulb, which body constitutes the sole source of light. Flash lamps comprising loosely arranged combustible material, which occupies substantially the entire space within the lamp bulb may also be used when provided with suitable bases having wires which may be passed through the strip 13. Lamps comprising such material are commercially available and a species thereof is disclosed in U. S. Patent 2,306,563, issued December 29, 1942, to Marvin Pipkin.

The multiflash lamp unit is claimed in application Serial No. 508,495, filed November 1, 1943, by Edward B. Noel, one of the inventors named herein.

What we claim as new and desire to secure by Letters Patent of the United States is:

1. A multiple flash lamp device comprising lamp support means arranged to support a lamp carrier comprising a strip carrying a plurality of flash lamps, a concave reflector movably supported adjacent said lamp support means and of sufficient depth to normally surround and enclose one of said lamps, actuating means engageable with the lamp carrier and reflector so as to synchronize advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector and said actuating means in juxtaposition.

2. A multiple flash lamp device comprising lamp support means arranged to support a lamp carrier comprising a strip carrying a plurality of flash lamps, a concave reflector movably supported adjacent said lamp support means and of sufficient depth to normally surround and enclose one of said lamps, actuating means engageable with the reflector and a lamp on said strip so as to synchronize advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector and said actuating means in juxtaposition.

3. A multiple flash lamp device comprising lamp support means having spaced wheels to support a lamp carrier comprising a strip carrying a plurality of flash lamps, a concave reflector movably supported adjacent said lamp support means and of sufficient depth to normally surround and enclose one of said lamps, actuating means engageable with the lamp carrier and the reflector to synchronize advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector and said actuating means in juxtaposition.

4. A multiple flash lamp device comprising lamp support means having wheels arranged for relative displacements and for supporting a lamp carrier comprising an endless strip carrying a plurality of flash lamps, a concave reflector movably supported adjacent said lamp support means and of sufficient depth to normally surround and enclose one of said lamps, actuating means engageable with the lamp carrier and the reflector to synchronize advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector and said actuating means in juxtaposition.

5. A multiple flash lamp device comprising lamp support means arranged to support a lamp carrier comprising a strip carrying a plurality of flash lamps, a concave reflector movably supported adjacent said lamp support means and of sufficient depth to normally surround and enclose one of said lamps, contacts of an electric ignition circuit for the lamps arranged to engage the contacts of a lamp enclosed by said reflector, actuating means engageable with the lamp carrier and the reflector to synchronize advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector, said contacts and said actuating means in juxtaposition.

6. A multiple flash lamp device comprising lamp support means arranged to support a lamp carrier comprising a strip carrying a plurality of flash lamps, a concave reflector movably supported adjacent said lamp support means and of sufficient depth to normally surround and enclose one of said lamps, a light filter disposed over and substantially closing the mouth of said reflector, actuating means engageable with the lamp carrier and the reflector to synchronous advancement of said lamp carrying strip on said lamp support means to move successive lamps first into and then, after being flashed, out of said reflector together with displacement of the reflector out of the path of movement of the lamps during each advancement thereof, and means supporting said lamp support means, said reflector and said actuating means in juxtaposition.

EDWARD B. NOEL.
AUGUST W. SEITZ.